United States Patent
Muto et al.

[11] Patent Number: 6,003,492
[45] Date of Patent: Dec. 21, 1999

[54] THROTTLE CONTROL APPARATUS

[75] Inventors: Masahito Muto, Toyota; Mamoru Nakamura, Kariya; Akira Kume, Anjo, all of Japan

[73] Assignee: Aisin Seiki Kabushiki Kaisha, Kariya, Japan

[21] Appl. No.: 09/042,663

[22] Filed: Mar. 17, 1998

[30] Foreign Application Priority Data

Mar. 17, 1997 [JP] Japan ..................................... 9-63249
Mar. 10, 1998 [JP] Japan ..................................... 10-57885

[51] Int. Cl.$^6$ ....................................................... F02D 7/00
[52] U.S. Cl. ........................................... 123/399; 123/361
[58] Field of Search .................................... 123/399, 361, 123/352; 180/179, 178

[56] References Cited

U.S. PATENT DOCUMENTS

| 4,856,477 | 8/1989 | Hanaoka et al. ........................ 123/361 |
| 4,951,772 | 8/1990 | Peter et al. ............................. 123/361 |
| 5,002,032 | 3/1991 | Kolberg ................................... 123/361 |
| 5,035,218 | 7/1991 | Takeuchi et al. ...................... 123/361 |
| 5,048,484 | 9/1991 | Terazawa et al. ..................... 123/361 |
| 5,056,613 | 10/1991 | Porter et al. ............................ 123/361 |
| 5,398,013 | 3/1995 | Suzuki et al. . |

FOREIGN PATENT DOCUMENTS 7-39107  2/1995  Japan .

OTHER PUBLICATIONS

"Leone New Car Features Jul. 1984" issued by Fuji Heavy Industries Ltd., pp. 13–44–13–47.

*Primary Examiner*—John Kwon
*Attorney, Agent, or Firm*—Burns, Doane, Swecker & Mathis, LLP

[57] ABSTRACT

A throttle control apparatus which is adapted to be disposed near the accelerator pedal of a vehicle includes an electric motor, and an operational member which is operatively connected to the output shaft of the electric motor for abutting against the accelerator pedal in order to swing the accelerator pedal during operation of the motor. The motor is positioned within a housing and is operatively connected to the operational member by way of interengaging gears located in the housing and a rotation shaft extending through the housing. To facilitate the mounting of the housing on the vehicle dashboard, a two-piece bracket can be employed.

19 Claims, 4 Drawing Sheets

THROTTLE CONTROL APPARATUS

FIELD OF THE INVENTION

The present invention generally relates to a throttle control apparatus. More particularly, the present invention pertains to a throttle control apparatus for an engine of a vehicle such as an automobile, ship or the like.

BACKGROUND OF THE INVENTION

A conventional throttle control apparatus is disclosed in "Leone New Car Features July, 1984" issued by Fuji Heavy Industries Ltd. The throttle control apparatus disclosed in this publication includes a vacuum pump installed in the engine compartment and a vacuum actuator disposed in the passenger compartment of the vehicle.

The vacuum actuator of the throttle control apparatus is driven by negative air pressure supplied from the vacuum pump in order to move the accelerator pedal connected to the vacuum actuator. The accelerator pedal controls the throttle opening of the engine.

In accordance with this known throttle control apparatus, the vacuum actuator does not have to be connected to the accelerator pedal with a cable because the vacuum actuator is not disposed in the engine compartment. Therefore, undesirable sliding resistance is not generated when the vacuum actuator is operated. Further, the throttle control apparatus can be manufactured at a relatively low cost because the throttle control apparatus does not require a complex link mechanism.

However, the throttle control apparatus does require a vacuum tube that connects the vacuum pump and the vacuum actuator. This vacuum tube must pass or extend through the dashboard that separates the engine compartment from the passenger compartment. For this reason, an opening is provided in the dashboard through which the vacuum tube extends. Thus, a seal member must be fitted in the opening in the dashboard to prevent rain water from entering the passenger compartment. Further, the vacuum tube must be located in the engine compartment. This construction increases the cost associated with outfitting the vehicle with such a throttle control apparatus.

In light of the foregoing, a need exists for a throttle control apparatus which is relatively less expensive to implement in a vehicle.

SUMMARY OF THE PRESENT INVENTION

In light of the foregoing, the present invention provides a throttle control apparatus positionable adjacent an accelerator pedal in the passenger compartment of a vehicle. The apparatus includes a housing, an electric motor disposed in the housing and provided with a motor output shaft, and a rotation shaft positioned within the housing for rotation with respect to the housing. The rotation shaft has one end projecting out from one side of the housing and the rotation shaft is operatively connected to the motor output shaft. An operational member is operatively connected to the end of the rotation shaft that extends out of the housing for engaging the accelerator pedal to move the accelerator pedal during operation of the electric motor.

According to another aspect of the invention, a throttle control apparatus that is mountable on a vehicle dashboard at a position adjacent an accelerator pedal of the vehicle to control opening of a vehicle throttle includes a motor having a motor output shaft, and an operational member operatively connected to the motor output shaft for contacting an accelerator pedal to effect movement of the accelerator pedal and opening of the vehicle throttle upon operation of the motor.

In accordance with another aspect of the invention, a throttle control apparatus that is adapted to be mounted on the vehicle dashboard at a position adjacent the vehicle accelerator pedal includes a housing, an electric motor disposed in the housing and provided with a motor output shaft, an operational member positioned exterior of the housing for engaging the accelerator pedal to move the accelerator pedal during operation of the electric motor, and means for operatively connecting the motor output shaft with the operational member to transfer rotational movement of the motor output shaft to the operational member to cause the operational member to move and thereby move the accelerator pedal.

BRIEF DESCRIPTION OF THE DRAWING FIGURES

The foregoing and additional features associated with the throttle control apparatus of the present invention will become more apparent from the following detailed description considered with reference to the accompanying drawing figures in which like elements are designated by like reference numerals and wherein.

DETAILED DESCRIPTION OF THE INVENTION

Figure 1:
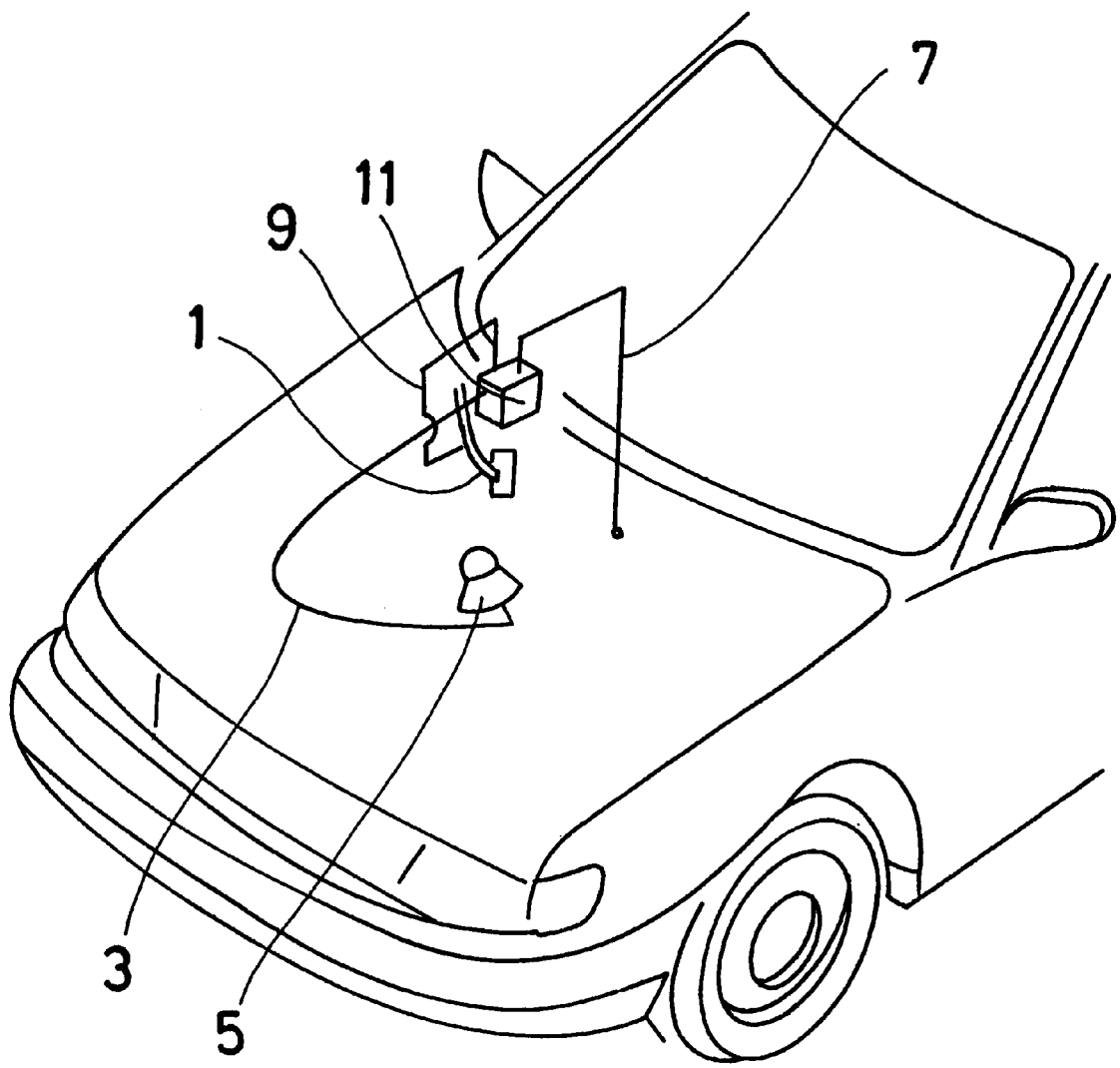
FIG. 1 is a perspective view of a vehicle schematically illustrating the throttle control apparatus of the invention mounted in the vehicle.

With reference initially to FIG. 1, the general location of the throttle control apparatus of the present invention and its connection to other parts of the vehicle are illustrated. As can be seen, the accelerator pedal 1 is disposed at the lower portion of the passenger compartment of the vehicle. The accelerator pedal 1 is connected to the throttle arm 5 of the engine through an accelerator cable 3.

The throttle arm 5 is connected to a throttle valve (not specifically illustrated) so that the throttle valve and the throttle arm 5 rotate together. Therefore, when the driver of the vehicle operates the accelerator pedal 1, the throttle valve is driven or moved to control the degree or amount of opening of the engine throttle valve.

An actuator 11 is disposed in the passenger compartment of the vehicle at a position near the accelerator pedal 1. The actuator 11 is operatively connected to the accelerator pedal 1 so that the accelerator pedal 1 is operated when the actuator 11 is operated.

A controller for determining the operation of the throttle arm 5 is installed in the actuator 11. The controller is connected to a speed signal cable 7 which transmits a signal indicative of the vehicle speed from the vehicle transmission to the controller. Also connected to the controller is a stroke signal cable 9. This stroke signal cable 9 transmits a signal indicative of the accelerator pedal stroke to the controller.

Figure 2:
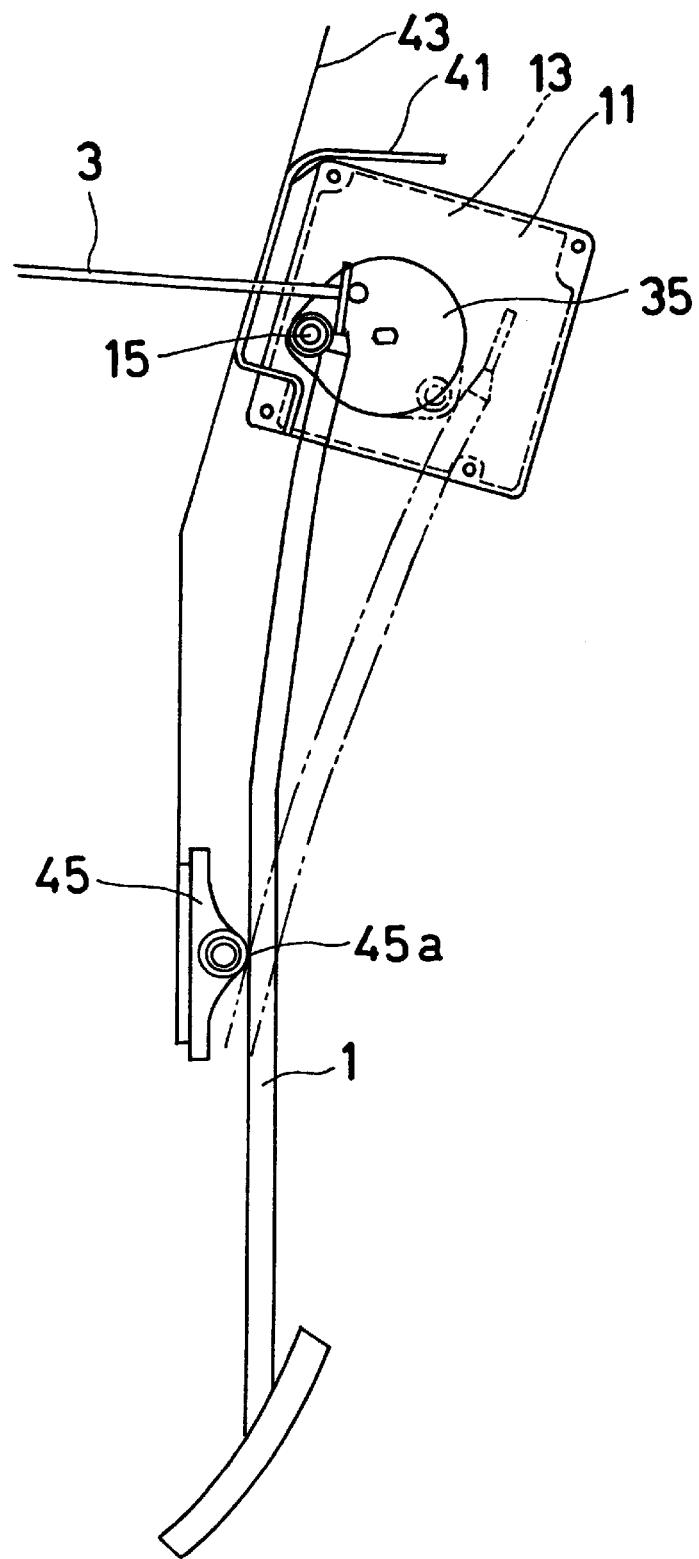
FIG. 2 is a left side view of the throttle control apparatus according to a first embodiment of the present invention illustrating the way in which the apparatus is mounted within the passenger compartment of the vehicle.

FIG. 2 illustrates the connection of the actuator 11 to the accelerator pedal 1. The non-operational condition of the accelerator pedal 1 is illustrated by the full line outline while the operational condition of the accelerator pedal 1 is illustrated by the dot and dash outline. The actuator 11 includes a housing 13 that is adapted to be fixed to a dashboard 43 of the vehicle through an actuator bracket 41. The bracket 41 can be secured to the dashboard in various ways such as through the use of bolts which are not specifically shown in FIG. 2.

A fulcrum member 45 is mounted on the lower portion of the dashboard 43 in a suitable manner such as through the use of bolts. The fulcrum member 45 is mounted on the dashboard 43 at a position below the actuator 11. The fulcrum member 45 is positioned so that the accelerator pedal 1 abuts against the top portion 45a of the fulcrum member 45.

As further seen in FIG. 2, the accelerator cable 3 is connected to the upper portion of the accelerator pedal 1. The accelerator cable 3 is also connected to the throttle arm 5 as described above with reference to the illustration in FIG. 1. The upper portion of the accelerator pedal 1 is pulled by the throttle arm 5 through the accelerator cable 3 to apply a rotational force to the accelerator pedal 1 in the counter clockwise direction in FIG. 2 so that the upper portion of the accelerator pedal 1 is in contact with a shoe 15 of the actuator 11.

Figure 3:
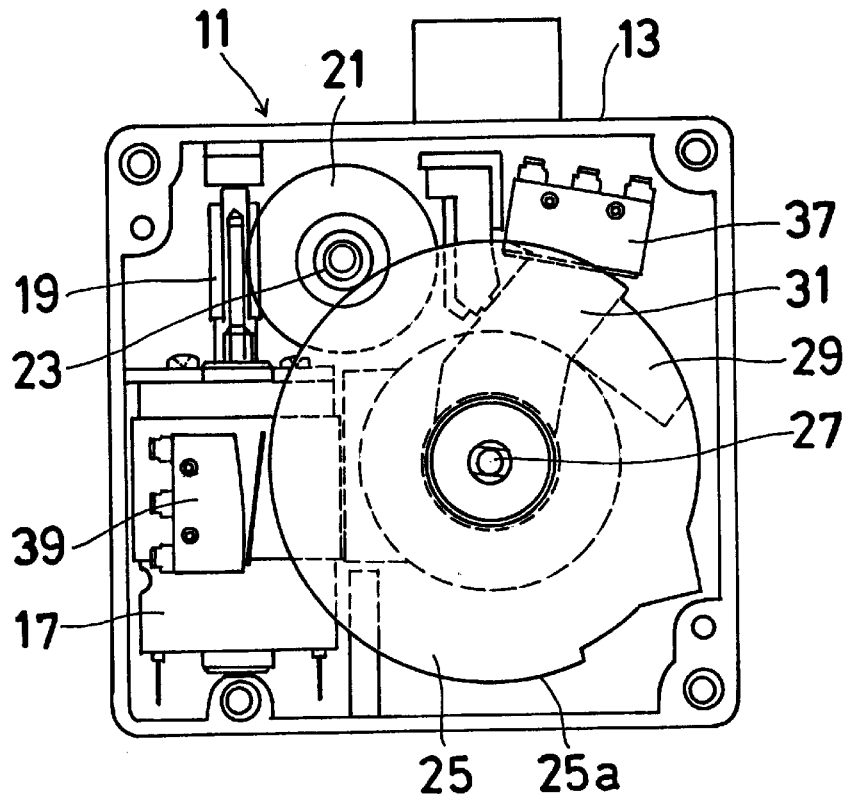
FIG. 3 is a left side view of the throttle control apparatus of the present invention.
Figure 4:
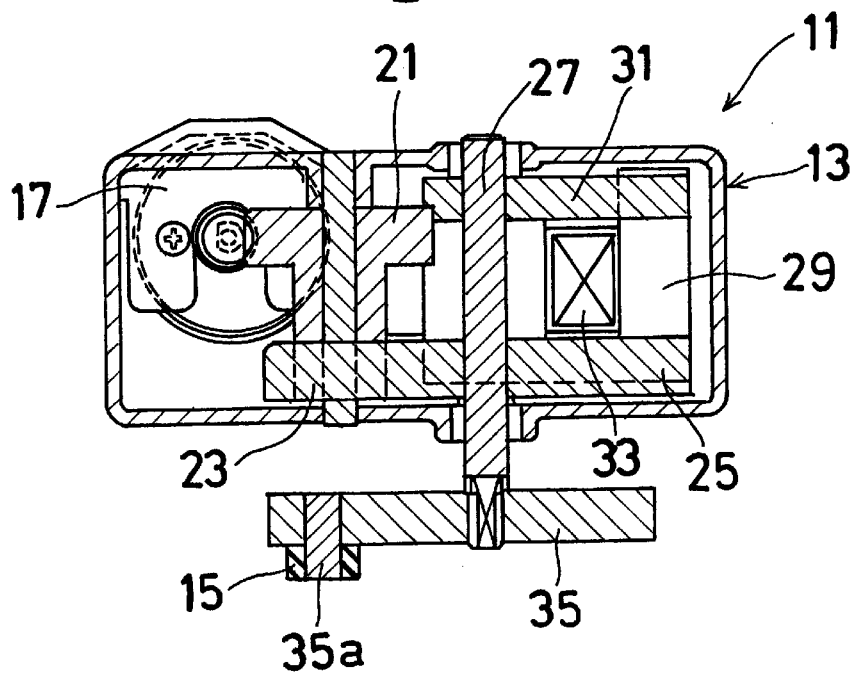
FIG. 4 is a cross-sectional view of the vehicle control apparatus illustrated in FIG. 3.

FIGS. 3 and 4 illustrate details associated with the actuator 11. A DC motor 17 which is connected to a battery is installed in the housing 13 of the actuator 11. The DC motor possesses an output shaft provided with a worm gear 19. A wheel gear 21 functioning as a reduction gear is disposed in the housing 13 and meshes with the worm gear 19 of the DC motor 17. Further, a pinion gear 23 is disposed on the wheel gear 21 and has teeth that engage with a toothed portion 25a of a disk gear 25.

The disk gear 25 is supported on a rotation shaft 27 so as to be rotatable relative to the rotation shaft 27. A first clutch member 29 is integrally disposed on the disk gear 25 so that the first clutch member 29 rotates with the disk gear 25.

The rotation shaft 27 passes completely through the housing 13 as shown in FIG. 4 and is mounted in a way that allows the rotation shaft 27 to rotate relative to the housing 13. A second clutch member 31 is integrally fixed on the rotation shaft 27 so that the second clutch member 31 is rotatable with the rotation shaft 27. A solenoid 33 is also positioned within the housing 13. The first and second clutch members 29, 31 function as an electromagnetic clutch together with the solenoid 33.

As seen in FIG. 4, a rotation disk 35 is connected to the lower end of the rotation shaft 27. It is to be noted that because the rotation shaft 27 passes through the housing 13, the respective ends of the rotation shaft 27 project out from the respective outer surfaces of the housing 13 (i.e., the surfaces corresponding to the upper surface and the lower surface shown in FIG. 4). This is advantageous because it allows the rotation disk 35 to be selectively connected to either end of the rotation shaft 27. In this way, the actuator 11 can be set up to operate the accelerator pedal 1 from either side. That is, the actuator 11 can be mounted on the dashboard so that the accelerator pedal 1 is located on the upper side of the actuator 11 shown in FIG. 4 or the actuator 11 can be mounted on the dashboard so that the accelerator pedal 1 is located on the lower side of the actuator 11 shown in FIG. 4.

As further seen in FIG. 4, a shoe pin 35a is fixed to the rotation disk 35 so that the shoe pin 35a projects from the lower surface of the rotation disk 35 (i.e., the surface of the disk 35 that faces away from the housing 13). The shoe 15 is fitted onto the outer circumferential portion of the shoe pin 35a to define a shoe member or operational member that is engaged by the end of the accelerator pedal 1 as shown in FIG. 2. The shoe 15 can be made of synthetic resin, rubber, or other similar types of materials. A pair of limit switches 37, 39 are positioned in the housing 13 and in contact with the outer surface of the disk gear 25 to restrict the range of rotation of the rotation disk 35.

When the controller determines that the throttle valve is in operation based on the vehicle speed signal and the stroke signal of the accelerator pedal 1, the controller sends an operation signal to the DC motor 17 to effect the driving operation of the DC motor 17. Simultaneously the controller supplies an electric current to the solenoid 33 so that the first and second clutch members 29, 31 are attracted to each other. The DC motor 17 drives the disk gear 25 in the counter clockwise direction with reference to the illustration in FIG. 2 through the worm gear 19, the wheel gear 21 and the pinion gear 23.

By virtue of the rotation of the disk gear 25, the rotation shaft 27 is rotated together with the second clutch member 31 in the counter direction with reference to the illustration in FIG. 3 through the first clutch member 29 to thereby rotate the rotation disk 35 in the counter clockwise direction with reference to the illustration in FIG. 2. Therefore, the shoe 15 rotates the accelerator pedal 1 about the fulcrum member 45 in the clockwise direction with reference to the illustration in FIG. 2. As the accelerator pedal 1 rotates, the accelerator cable 3 is pulled in the right direction with reference to the illustration in FIG. 2 to thereby rotate the throttle arm 5 of the engine. In this way, the amount or degree of opening of the throttle valve is controlled to the appropriate degree.

The throttle control apparatus of the present invention thus provides a relatively inexpensive apparatus for effecting throttle control which does not suffer from the same shortcomings as other known throttle control apparatus such as the conventional apparatus discussed above.

Figure 5:
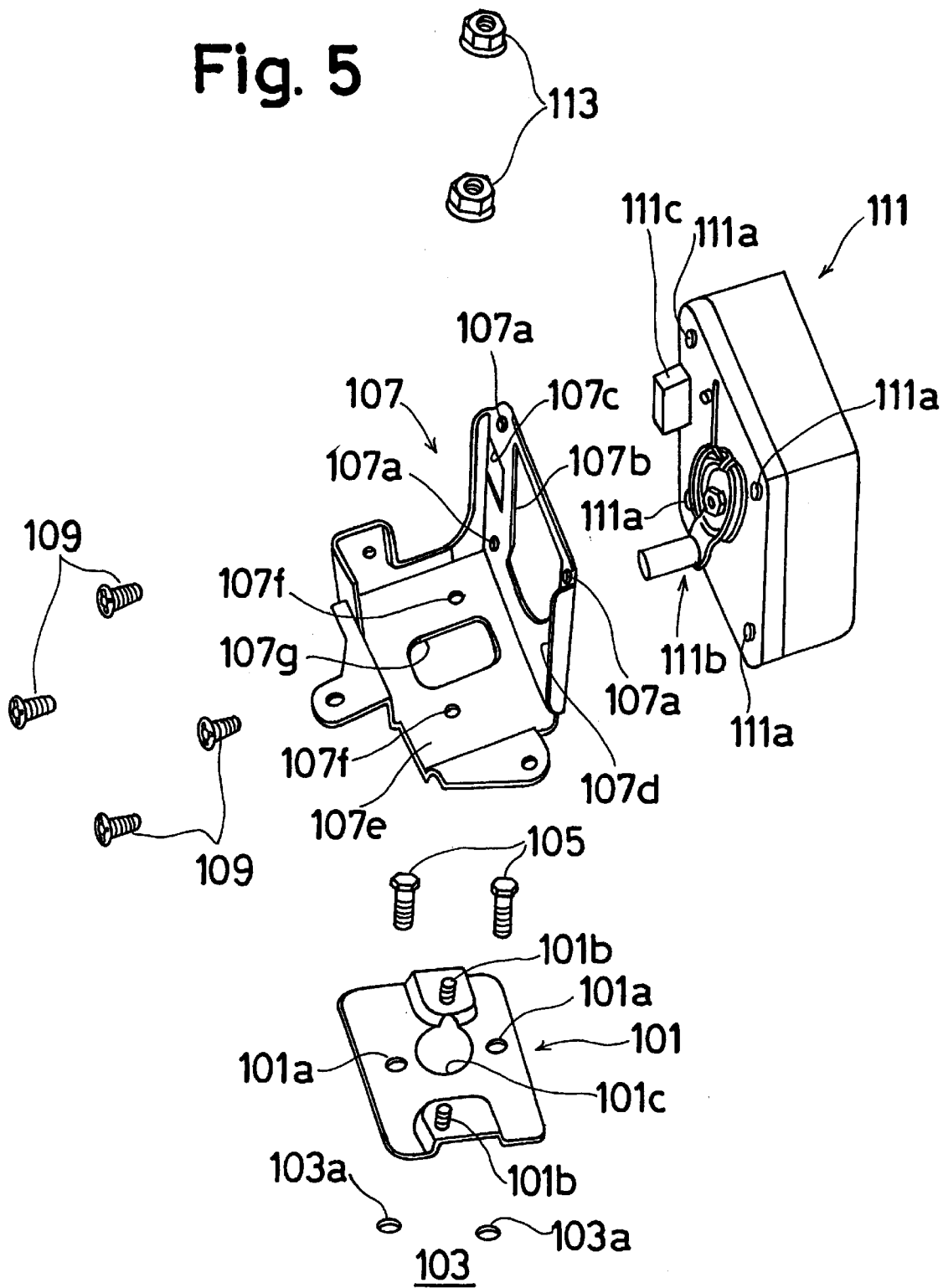
FIG. 5 is an exploded perspective view of another aspect of the present invention illustrating the features associated with a mounting bracket that can be used to mount the throttle control apparatus on a vehicle dashboard.

FIG. 5 illustrates the details associated with another aspect of the present invention, namely a mounting bracket for mounting the throttle control apparatus. This mounting bracket shown in FIG. 5 can be used as an alternative to the mounting bracket shown in FIG. 2. It is to be understood that the actuator 111 shown in FIG. 5 is constructed in generally the same manner as that shown in FIGS. 3 and 4, except for features necessary to accommodate the particular bracket construction shown in FIG. 5. Further, the operation of the actuator 111 shown in FIG. 5 is the same as that described above for the actuator 11 shown in FIGS. 3 and 4.

The mounting bracket shown in FIG. 5 includes a main bracket 107 and a sub-bracket 101. The sub-bracket 101 is a generally flat plate provided with raised portions at opposite sides through which extend stud bolts 101b. The generally flat plate is also provided with a generally centrally located opening 101c and a pair of mounting holes 101a. The dashboard 103 of the vehicle is provided with a pair of openings 103a which can be the same openings used to mount a conventional accelerator cable bracket. The sub-bracket 101 is adapted to be fixed to the side of the dashboard 103 which is exposed to or faces towards the passenger compartment through the use of a pair of bolts 105. The bolts 105 pass through the mounting holes 101a in the flat plate and the openings 103a in the dashboard 103 and are engaged with a pair of weld nuts (not specifically shown in FIG. 5) which are fixed to the back surface of the dashboard 103. In this way, the sub-bracket 101 is fixed to the dashboard 103.

The main bracket 107 includes an upstanding portion 107d and a bottom portion 107e that are disposed perpendicular to one another. The upstanding portion 107d of the main bracket 107 is provided with a relatively larger opening or window 107b and a relatively smaller connector window 107c. A shoe member or operational member 111b of the actuator 11 is adapted to be inserted into the opening 107b in the upstanding portion 107d of the main bracket 107 while a connector 111c of the actuator 111 is adapted to be inserted into the connector window 107c of the main bracket 107. The shoe member or operational member 111b of the actuator 111 is similar in function to the shoe member 15 illustrated in FIG. 4 and described above. The connector 111c of the actuator 111 is designed to properly align and orient the actuator 111 with respect to the main bracket 107 so that the actuator 111 is located in the correct rotational position with respect to the main bracket 107.

Four screws 109 are adapted to be extend through openings 107a provided in the upstanding portion 107d of the main bracket 107 and are adapted to engage respective screw holes 111a provided in the actuator 111 to mount the actuator 111 on the exterior side of the upstanding portion 107d of the main bracket 107.

The bottom portion 107e of the main bracket 107 is provided with a generally centrally located opening 107g and a pair of mounting holes 107f disposed on opposite sides of the generally centrally located opening 107g. The pair of stud bolts 101b of the sub-bracket 101 are inserted into the pair of mounting holes 107f disposed on the bottom portion 107e of the main bracket 107. In addition, a pair of nuts 113 are engaged with the stud bolts 101b so that the main bracket 107 with the actuator 111 is mounted on the side of the vehicle dash board 103 through the sub-bracket 101.

When the sub-bracket 101 and the main bracket 107 are connected together in the manner described above, the generally centrally located opening 101c in the sub-bracket 101 and the generally centrally located opening 107g in the main bracket are aligned and together define an access opening through which the accelerator cable extends. The accelerator cable is connected to the end of the accelerator pedal in a manner similar to that shown in FIG. 2 with the end of the accelerator pedal contacting the shoe member 111b that extends through the opening 107b in the upstanding portion 107d of the main bracket 107.

In accordance with the above-described embodiment, because the actuator 111 is mounted on the vehicle dashboard 103 through the sub-bracket 101 and the main bracket 107, the actuator 111 does not interfere with the screwing of the bolts 105 when the actuator 111 is mounted on the vehicle. This thus provides a relatively simple mechanism for mounting the actuator 111 on the dashboard of the vehicle.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A throttle control apparatus for being positioned adjacent an accelerator pedal, comprising:

a housing;

an electric motor disposed in the housing, said electric motor having a motor output shaft;

a rotation shaft positioned within the housing for rotation with respect to the housing and having one end projecting out from one side of the housing, said rotation shaft being operatively connected to the motor output shaft; and an operational member operatively connected to the one end of the rotation shaft for engaging the accelerator pedal to move the accelerator pedal during operation of the electric motor.

2. A throttle control apparatus according to claim 1, including first and second clutch members positioned within the housing and a solenoid positioned within the housing.

3. A throttle control apparatus according to claim 1, including an electromagnetic clutch positioned within the housing.

4. A throttle control apparatus according to claim 1, wherein the motor output shaft includes a worm gear that engages a wheel gear located within the housing, the wheel gear being provided with a pinion gear that engages a toothed portion of a disk gear supported on the rotation shaft, the disk gear being supported on the rotation shaft for rotating with respect to the rotation shaft.

5. A throttle control apparatus according to claim 4, including a first clutch member connected to the disk gear to rotate with the disk gear, and a second clutch member fixedly connected to the rotation shaft for rotating with the rotation shaft.

6. A throttle control apparatus according to claim 1, including a rotation disk fixed to the one end of the rotation shaft.

7. A throttle control apparatus according to claim 6, wherein the operational member includes a shoe pin fixed to the rotation disk and a shoe member extending from the rotation disk in a direction away from the housing.

8. A throttle control apparatus according to claim 1, including a two piece bracket for mounting the housing on a side of a vehicle dashboard facing the passenger compartment, the two piece bracket including a main bracket connectable to the housing of the actuator and a sub-bracket connectable to the main bracket, the sub-bracket being connectable to the dashboard.

9. A throttle control apparatus mounted in a vehicle to control opening of a vehicle throttle that is connected to an accelerator pedal by a cable, comprising:

a motor having a motor output shaft; and an operational member operatively connected to the motor output shaft and operatively associated with the accelerator pedal to move in response to operation of the motor and cause movement of the accelerator pedal to thereby effect opening of the vehicle throttle by way of the cable.

10. A throttle control apparatus according to claim 9, wherein the motor is positioned within a housing.

11. A throttle control apparatus according to claim 9, wherein the operational member is operatively connected to the motor output shaft by way of a rotation shaft, and including a housing through which the rotation shaft extends, one end of the rotation shaft extending out of the housing and being operatively connected to the operational member.

12. A throttle control apparatus according to claim 11, wherein the motor output shaft includes a worm gear that engages a wheel gear located within the housing, the wheel gear being provided with a pinion gear that engages a toothed portion of a disk gear supported on the rotation shaft, the disk gear being supported on the rotation shaft for rotating with respect to the rotation shaft.

13. A throttle control apparatus according to claim 12, including a first clutch member connected to the disk gear to rotate with the disk gear, and a second clutch member fixedly connected to the rotation shaft for rotating with the rotation shaft.

14. A throttle control apparatus according to claim 9, including a two-piece bracket comprising a main bracket connectable to the housing and a sub-bracket connectable to the main bracket, and means for mounting the sub-bracket on a vehicle dashboard.

15. A throttle control apparatus for being positioned adjacent an accelerator pedal, comprising:
   a housing;
   an electric motor disposed in the housing, said electric motor having a motor output shaft;
   an operational member positioned exterior of the housing for engaging the accelerator pedal to move the accelerator pedal during operation of the electric motor; and
   means for operatively connecting the motor output shaft with the operational member to transfer rotational movement of the motor output shaft to the operational member to cause the operational member to move and thereby move the accelerator pedal.

16. A throttle control apparatus according to claim 15, including an electromagnetic clutch positioned within the housing.

17. A throttle control apparatus according to claim 15, wherein the means for operatively connecting the motor output shaft with the operational member includes a rotation shaft positioned within the housing for rotation with respect to the housing and having one end projecting out from one side of the housing, said operational member being mounted on the one end of the rotation shaft.

18. A throttle control apparatus according to claim 15, wherein the means for operatively connecting the motor output shaft with the operational member further includes the motor output shaft being provided with a worm gear that engages a wheel gear located within the housing, the wheel gear being provided with a pinion gear that engages a toothed portion of a disk gear supported on the rotation shaft, the disk gear being supported on the rotation shaft for rotating with respect to the rotation shaft.

19. A throttle control apparatus according to claim 18, wherein the means for operatively connecting the motor output shaft with the operational member further includes a first clutch member connected to the disk gear to rotate with the disk gear, and a second clutch member fixedly connected to the rotation shaft for rotating with the rotation shaft.

* * * * *